US012656106B1

(12) United States Patent
Lu et al.

(10) Patent No.: US 12,656,106 B1
(45) Date of Patent: Jun. 16, 2026

(54) METHOD AND APPARATUS FOR MEASURING INNER SURFACE AND TRANSITION CURVED SURFACE CONTOUR OF MICROPORE

(71) Applicant: Huazhong University of Science and Technology, Wuhan City (CN)

(72) Inventors: Wenlong Lu, Wuhan City (CN); Yunquan Wu, Wuhan City (CN)

(73) Assignee: Huazhong University of Science and Technology, Wuhan City (CN)

( * ) Notice: Subject to any disclaimer, the term of this patent is extended or adjusted under 35 U.S.C. 154(b) by 0 days.

(21) Appl. No.: 19/425,711

(22) Filed: Dec. 18, 2025

(30) Foreign Application Priority Data

Jun. 4, 2025 (CN) .......................... 202510735480.4

(51) Int. Cl.
| | |
|---|---|
| *G01B 11/245* | (2006.01) |
| *G01J 3/02* | (2006.01) |
| *G01J 3/30* | (2006.01) |
| *G01J 3/10* | (2006.01) |
| *G01J 3/28* | (2006.01) |

(52) U.S. Cl.
CPC .......... *G01B 11/245* (2013.01); *G01J 3/0218* (2013.01); *G01J 3/0256* (2013.01); *G01J 3/0294* (2013.01); *G01J 3/30* (2013.01); *G01J 2003/102* (2013.01); *G01J 2003/2859* (2013.01)

(58) Field of Classification Search
CPC . G01B 2210/50; G01B 11/245; G01J 3/0218; G01J 3/0256; G01J 3/0294; G01J 3/30; G01J 2003/102; G01J 2003/2859
See application file for complete search history.

(56) References Cited

U.S. PATENT DOCUMENTS

| | | | | |
|---|---|---|---|---|
| 5,526,338 | A * | 6/1996 | Hasman ................... | G11B 7/14 |
| | | | | 369/112.17 |
| 10,288,868 | B2 * | 5/2019 | Tearney ................... | A61B 1/07 |
| 2004/0173738 | A1 * | 9/2004 | Mizuno ............. | G02B 26/0841 |
| | | | | 250/234 |
| 2008/0013960 | A1 * | 1/2008 | Tearney ............... | A61B 5/0084 |
| | | | | 398/139 |

(Continued)

FOREIGN PATENT DOCUMENTS

EP 3430362 B1 * 4/2020 ............... G01J 3/44

*Primary Examiner* — Michael P LaPage
(74) *Attorney, Agent, or Firm* — Berkeley Law & Technology Group, LLP

(57) ABSTRACT

A method and an apparatus for measuring an inner surface and a transition curved surface contour of a micropore are provided. The apparatus includes three independent optical paths, a spectrometer and a processing unit. The three optical paths use a fiber-reflecting prism-dispersive metalens structure. By adjusting the position of a probe, light can be irradiated on the inner surface and the transition curved surface contour of the micropore, and each scanning point on the surface can be scanned. The spectrometer analyzes the reflection spectrum received by each optical fiber in real time, and extracts peak wavelength of the scanning point. The processing unit calculates a displacement value of each scanning point based on a wavelength-displacement mapping relationship, reconstructs position information, and obtains a contour of a surface through data fitting.

10 Claims, 4 Drawing Sheets

(56)     References Cited

U.S. PATENT DOCUMENTS

| | | | |
|---|---|---|---|
| 2010/0210937 A1* | 8/2010 | Tearney | A61B 5/0066 |
| | | | 600/407 |
| 2011/0237892 A1* | 9/2011 | Tearney | G02B 23/2423 |
| | | | 600/160 |
| 2018/0120555 A1* | 5/2018 | Ikuta | G02B 6/34 |
| 2021/0381821 A1* | 12/2021 | Gaillard-Groleas | |
| | | | G01B 11/303 |
| 2024/0093982 A1* | 3/2024 | Joo | G02B 21/00 |
| 2025/0044152 A1* | 2/2025 | Scarcelli | G01J 3/021 |

* cited by examiner

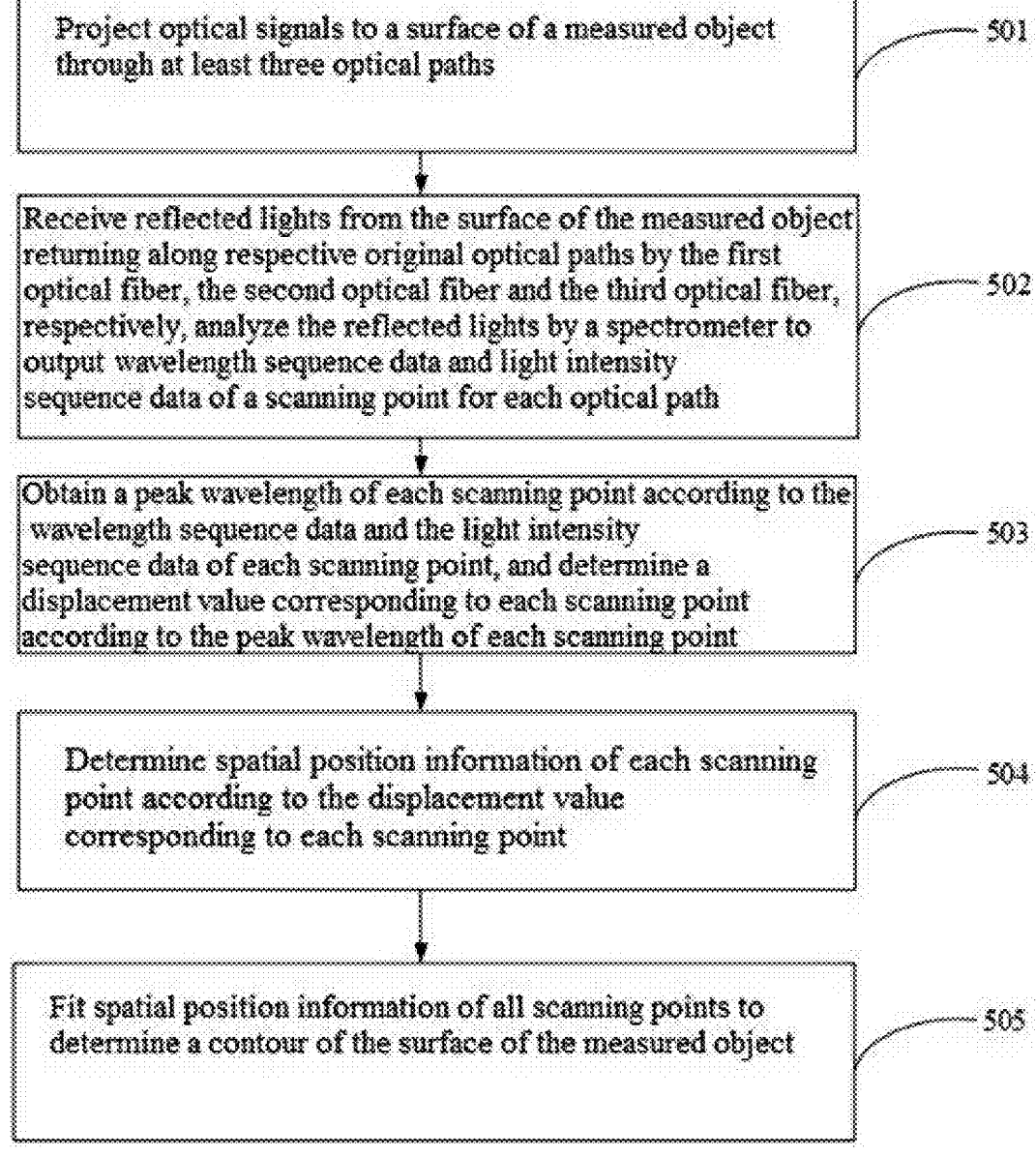

Project optical signals to a surface of a measured object through at least three optical paths — 501

Receive reflected lights from the surface of the measured object returning along respective original optical paths by the first optical fiber, the second optical fiber and the third optical fiber, respectively, analyze the reflected lights by a spectrometer to output wavelength sequence data and light intensity sequence data of a scanning point for each optical path — 502

Obtain a peak wavelength of each scanning point according to the wavelength sequence data and the light intensity sequence data of each scanning point, and determine a displacement value corresponding to each scanning point according to the peak wavelength of each scanning point — 503

Determine spatial position information of each scanning point according to the displacement value corresponding to each scanning point — 504

Fit spatial position information of all scanning points to determine a contour of the surface of the measured object — 505

FIG. 5

METHOD AND APPARATUS FOR MEASURING INNER SURFACE AND TRANSITION CURVED SURFACE CONTOUR OF MICROPORE

CROSS-REFERENCE TO RELATED PRESENT DISCLOSURE

This patent application claims the benefit and priority of Chinese Patent Application No. 202510735480.4 filed with the China National Intellectual Property Administration on Jun. 4, 2025, the disclosure of which is incorporated by reference herein in its entirety as part of the application.

TECHNICAL FIELD

The present disclosure relates to the technical field of optical measurement, and in particular, to a method and an apparatus for measuring an inner surface and a transition curved surface contour of a micropore.

BACKGROUND

The measurement of an inner surface of a micropore with a step diameter and a transition curved surface contour has long been a challenge in the industry. The existing non-contact measurement methods, including confocal laser, line laser, structured light, and the like, have one or several defects, such as a large volume, difficulty in measuring a high-reflective surface, inability to measure high-curvature transition characteristics, and inability to measure an inner surface and a curved surface contour of a micropore. The chromatic confocal sensing technology is widely used in the fields such as electronic manufacturing, aerospace, laser nuclear fusion, automobile, biology, and IC manufacturing because of remarkable application advantages such as high measurement accuracy and axial chromatography ability.

However, due to the limitation of the material and the structure of a lens, a conventional lens-type chromatic confocal displacement sensor has a limited minimum volume and an insufficient tolerance angle, and cannot be applied to the measurement of an inner surface and a curved surface contour of a micropore. Therefore, it is of great significance to develop a chromatic confocal high-precision non-contact displacement sensor with micro-size and curved surface contour measurement ability.

SUMMARY

The present disclosure provides a method and an apparatus for measuring an inner surface and a transition curved surface contour of a micropore, so as to solve the defects that due to the limitation of the material and the structure of a lens, a conventional lens-type chromatic confocal displacement sensor has a limited minimum volume and an insufficient tolerance angle, and cannot be applied to the measurement of an inner surface and a curved surface contour of a micropore.

In a first aspect, the present disclosure provides an apparatus for measuring an inner surface and a transition curved surface contour of a micropore, where the apparatus includes: at least three optical paths, a spectrometer and a processing unit;

the at least three optical paths include a first optical path, a second optical path and a third optical path;

the first optical path includes a first optical fiber, a first reflecting prism and a first dispersive metalens, and divergent light emitted by the first optical fiber is reflected to the first dispersive metalens via the first reflecting prism and focused on a surface of a measured object through the first dispersive metalens;

the second optical path includes a second optical fiber, a second reflecting prism and a second dispersive metalens, and divergent light emitted by the second optical fiber is reflected to the second dispersive metalens via the second reflecting prism and focused on the surface of the measured object through the second dispersive metalens; and the third optical path includes a third optical fiber, a third reflecting prism and a third dispersive metalens, and divergent light emitted by the third optical fiber is reflected to the third dispersive metalens via the third reflecting prism and focused on the surface of the measured object through the third dispersive metalens;

the spectrometer is configured to analyze reflected lights from the surface of the measured object returning along respective original optical paths and received by the first optical fiber, the second optical fiber and the third optical fiber, respectively, and output wavelength sequence data and light intensity sequence data of a scanning point for each optical path;

the processing unit is configured to:

obtain a peak wavelength of each scanning point according to the wavelength sequence data and the light intensity sequence data of each scanning point, and determine a displacement value corresponding to each scanning point according to the peak wavelength of each scanning point;

determine spatial position information of each scanning point according to the displacement value corresponding to each scanning point; and fit spatial position information of all scanning points to determine a contour of the surface of the measured object; wherein the contour of the surface of the measured object comprises the inner surface and the transition curved surface contour of the micropore;

where the inner surface of the micropore is determined by using a scanning point corresponding to the first optical path; and the transition curved surface contour is determined by using scanning points corresponding to all optical paths.

According to the apparatus for measuring the inner surface and the transition curved surface contour of the micropore provided by the present disclosure, optical axes of the first dispersive metalens, the second dispersive metalens, and the third dispersive metalens are arranged according to respective preset inclination angles, and correspond to areas of the surface of the measured object in different ranges of inclination angle, respectively.

According to the apparatus for measuring the inner surface and the transition curved surface contour of the micropore provided by the present disclosure, the apparatus further includes: a probe shell; and the at least three optical paths are arranged in the probe shell.

According to the apparatus for measuring the inner surface and the transition curved surface contour of the micropore provided by the present disclosure, the divergent light emitted by each optical fiber is broad-spectrum divergent light.

According to the apparatus for measuring the inner surface and the transition curved surface contour of the micropore provided by the present disclosure, determining the displacement value corresponding to each scanning point according to the peak wavelength of each scanning point includes: using a predetermined mapping function to convert the peak wavelength into the displacement value.

According to the apparatus for measuring the inner surface and the transition curved surface contour of the micropore provided by the present disclosure, the mapping function is a polynomial.

In a second aspect, the present disclosure further provides a method for measuring an inner surface and a transition curved surface contour of a micropore, including:

projecting optical signals to a surface of a measured object through at least three optical paths, where:

in a first optical path, divergent light emitted by a first optical fiber is reflected via a first reflecting prism and focused on the surface of the measured object through a first dispersive metalens;

in a second optical path, divergent light emitted by a second optical fiber is reflected via a second reflecting prism and focused on the surface of the measured object through a second dispersive metalens; and in a third optical path, divergent light emitted by a third optical fiber is reflected via a third reflecting prism and focused on the surface of the measured object through a third dispersive metalens;

receiving reflected lights from the surface of the measured object returning along respective original optical paths by the first optical fiber, the second optical fiber and the third optical fiber, respectively, analyzing the reflected lights by a spectrometer to output wavelength sequence data and light intensity sequence data of a scanning point for each optical path;

obtaining a peak wavelength of each scanning point according to the wavelength sequence data and the light intensity sequence data of each scanning point, and determining a displacement value corresponding to each scanning point according to the peak wavelength of each scanning point;

determining spatial position information of each scanning point according to the displacement value corresponding to each scanning point; and fitting spatial position information of all scanning points to determine a contour of the surface of the measured object; wherein the contour of the surface of the measured object comprises the inner surface and the transition curved surface contour of the micropore;

where the inner surface of the micropore is determined by using a scanning point corresponding to the first optical path; and the transition curved surface contour is determined by using scanning points corresponding to all optical paths.

According to the method for measuring the inner surface and the transition curved surface contour of the micropore provided by the present disclosure, optical axes of the first dispersive metalens, the second dispersive metalens, and the third dispersive metalens are arranged according to respective preset inclination angles, and correspond to areas of the surface of the measured object in different ranges of inclination angle, respectively.

According to the method for measuring the inner surface and the transition curved surface contour of the micropore provided by the present disclosure, the divergent light in each optical path is broad-spectrum divergent light.

According to the method for measuring the inner surface and the transition curved surface contour of the micropore provided by the present disclosure, determining the displacement value corresponding to each scanning point according to the peak wavelength of each scanning point includes: using a predetermined mapping function to convert the peak wavelength into the displacement value.

According to the present disclosure, the use of the structural design that a plurality of optical paths are integrated with dispersive metalenses effectively breaks through the limitation of the conventional chromatic confocal sensor that the volume is large and the tolerance angle is small, and achieves the high-precision non-contact measurement of the inner surface and the transition curved surface contour of the micropore. That is, three groups of dispersive metalenses and optical paths are used for collaborative measurement, so that the sensor volume is compressed to adapt to a narrow space, and further, the detection capability of complex curved surfaces (including high-curvature transition characteristics) is improved through the coverage of multi-angle optical path. Combined with the axial tomography advantages of the chromatic confocal technology, the displacement value corresponding to the peak wavelength of each scanning point can be accurately extracted, and the surface morphology can be reconstructed by fitting three-dimensional spatial data, which solves the challenge in the industry that the conventional measurement technology find difficult to balance a small aperture and a complex curved surface in the fields such as electronic manufacturing and aerospace.

BRIEF DESCRIPTION OF THE DRAWINGS

In order to explain the technical solution of the present disclosure or the prior art more clearly, the drawings needed in the description of the embodiments or the prior art will be briefly introduced hereinafter. Obviously, the drawings in the following description are some embodiments of the present disclosure, and other drawings can be obtained according to these drawings without paying creative labor for those skilled in the art.

FIG. 5 is a flow chart of a method for measuring an inner surface and a transition curved surface contour of a micropore according to the present disclosure.

DESCRIPTION OF REFERENCE NUMERALS

1: first reflecting prism; 2: second reflecting prism; 3: third reflecting prism; 4: first optical fiber; 5: second optical fiber; 6: third optical fiber; 7: first dispersive metalens; 8: second dispersive metalens; 9: third dispersive metalens; 10: probe shell; 11: measured object; 12: spectrometer; 13: surface of a measured object; 14: light source; 15 processing unit.

DETAILED DESCRIPTION OF THE EMBODIMENTS

In order to make the objective, the technical solution and the advantage of the present disclosure more clear, the technical solution in the present disclosure will be described clearly and completely with reference to the drawings hereinafter. Obviously, the described embodiments are some of the embodiments of the present disclosure, rather than all of the embodiments. Based on the embodiments in the present disclosure, all other embodiments obtained by those skilled in the art without paying creative labor belong to the scope of protection of the present disclosure.

It should be noted that in the description of embodiments of the present disclosure, the terms "including", "containing" or any other variation thereof are intended to cover non-exclusive inclusion, so that a process, a method, an article or a device including a series of elements includes not only those elements, but also other elements not explicitly listed, or elements inherent to such process, method, article or device. For those skilled in the art, the specific meanings of the above terms in the present disclosure can be understood according to specific situations.

The terms "first" and "second" in the present disclosure are used to distinguish similar objects, and are not used to describe a specific order or sequence. It should be understood that the terms used in this way can be interchanged where appropriate, so that the embodiments of the present disclosure can be implemented in an order other than those illustrated or described here. Moreover, the objects distinguished by "first", "second" and the like usually belong to one class. The number of objects is not limited. For example, the number of first objects can be one or more.

Figure 1:
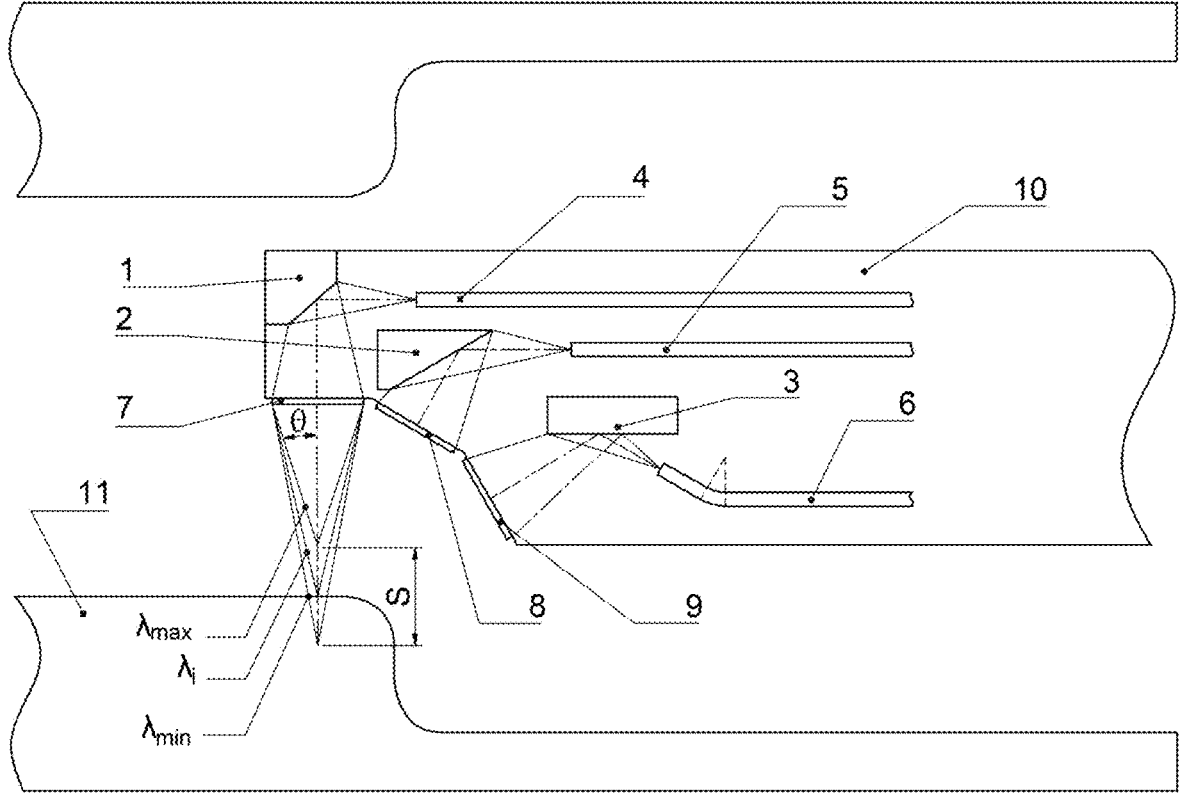
FIG. 1 is a first schematic diagram of an optical path of a measuring apparatus according to the present disclosure.
Figure 2:
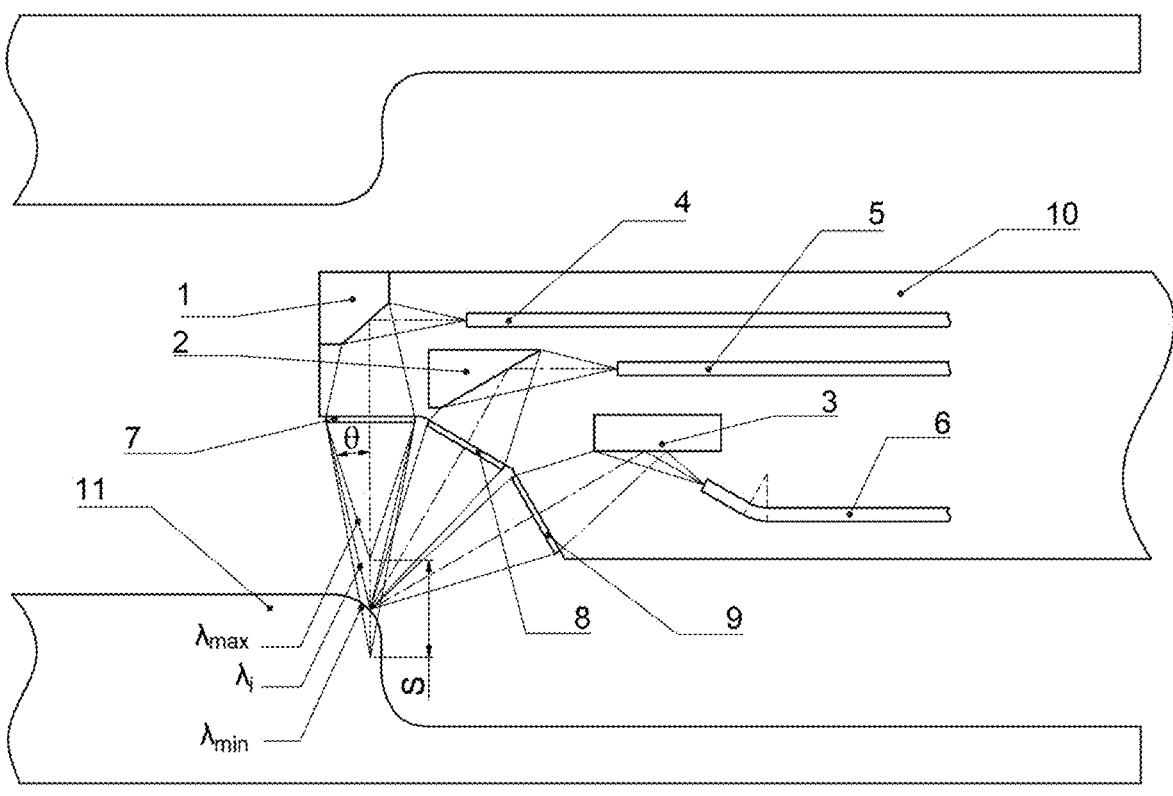
FIG. 2 is a second schematic diagram of an optical path of the measuring apparatus according to the present disclosure.
Figure 3:
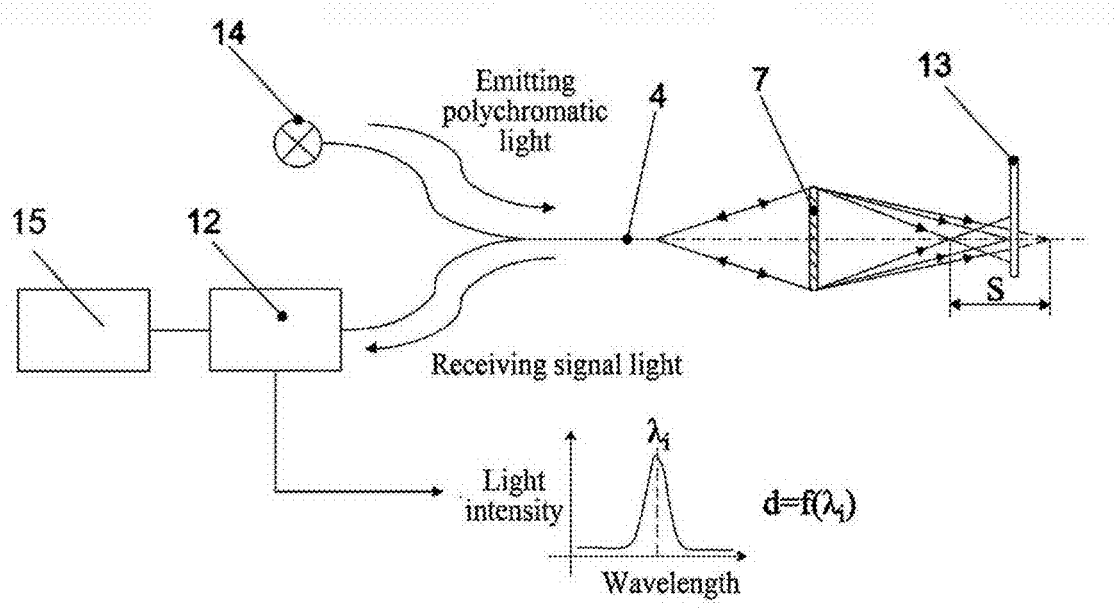
FIG. 3 is a schematic diagram of a measuring process by a dispersive metalens in the apparatus according to the present disclosure.

FIG. 1 is a first schematic diagram of an optical path of a measuring apparatus according to the present disclosure; FIG. 2 is a second schematic diagram of an optical path of the measuring apparatus according to the present disclosure; and FIG. 3 is a schematic diagram of a measuring process by a dispersive metalens in the apparatus according to the present disclosure. The solution of the present disclosure will be described with reference to FIG. 1 to FIG. 3.

The apparatus for measuring the inner surface and the transition curved surface contour of the micropore provided by the present disclosure includes at least three optical paths, a spectrometer 12 and a processing unit 15.

The at least three optical paths include a first optical path, a second optical path and a third optical path; and preferably, the at least three optical paths are arranged in a probe shell 10.

The first optical path includes a first optical fiber 4, a first reflecting prism 1 and a first dispersive metalens 7, and divergent light emitted by the first optical fiber 4 is reflected to the first dispersive metalens 7 via the first reflecting prism 1 and focused on a surface 13 of a measured object through the first dispersive metalens 7.

The second optical path includes a second optical fiber 5, a second reflecting prism 2 and a second dispersive metalens 8, and divergent light emitted by the second optical fiber 5 is reflected to the second dispersive metalens 8 via the second reflecting prism 2 and focused on the surface 13 of the measured object through the second dispersive metalens 8.

The third optical path includes a third optical fiber 6, a third reflecting prism 3 and a third dispersive metalens 9, and divergent light emitted by the third optical fiber 6 is reflected to the third dispersive metalens 9 via the third reflecting prism 3 and focused on the surface 13 of the measured object through the third dispersive metalens 9.

The spectrometer 12 is configured to analyze reflected lights from the surface 13 of the measured object returning along respective original optical paths and received by the first optical fiber 4, the second optical fiber 5 and the third optical fiber 6, respectively, and to output wavelength sequence data and light intensity sequence data of a scanning point for each optical path.

The processing unit 15 is configured to:

obtain a peak wavelength of each scanning point according to the wavelength sequence data and the light intensity sequence data of each scanning point, and determine a displacement value corresponding to each scanning point according to the peak wavelength of each scanning point;

determine spatial position information of each scanning point according to the displacement value corresponding to each scanning point; and fit spatial position information of all scanning points to determine a contour of the surface of the measured object 11; where the contour of the surface of the measured object 11 includes the inner surface and the transition curved surface contour of the micropore;

where the inner surface of the micropore (which can be understood as a horizontal surface of an inner hole) is determined by using a scanning point corresponding to the first optical path; and the transition curved surface contour is determined by using scanning points corresponding to all optical paths.

Preferably, the divergent light emitted by each optical fiber is broad-spectrum divergent light. FIG. 1 shows an optical path of measuring an inner surface of the micropore according to the present disclosure, and FIG. 2 shows an optical path of measuring a transition curved surface contour according to the present disclosure.

The core structure of the apparatus according to the present disclosure is described hereinafter.

(1) Description of Each Component in the First Optical Path, the Second Optical Path and the Third Optical Path Optical fiber: the optical fiber is configured to receive light emitted by the light source and emit divergent light.

Reflecting prism: the reflecting prism is configured to adjust the direction of the optical path, so that the divergent light is incident on the dispersive metalens at a specific angle.

Dispersive metalens: the dispersive metalens is configures to use a linear relationship between a wavelength and a focal length to focus light with different wavelengths on different depth positions of the contour of the surface of the measured object.

(2) Arrangement of the Dispersive Metalens

Figure 4:
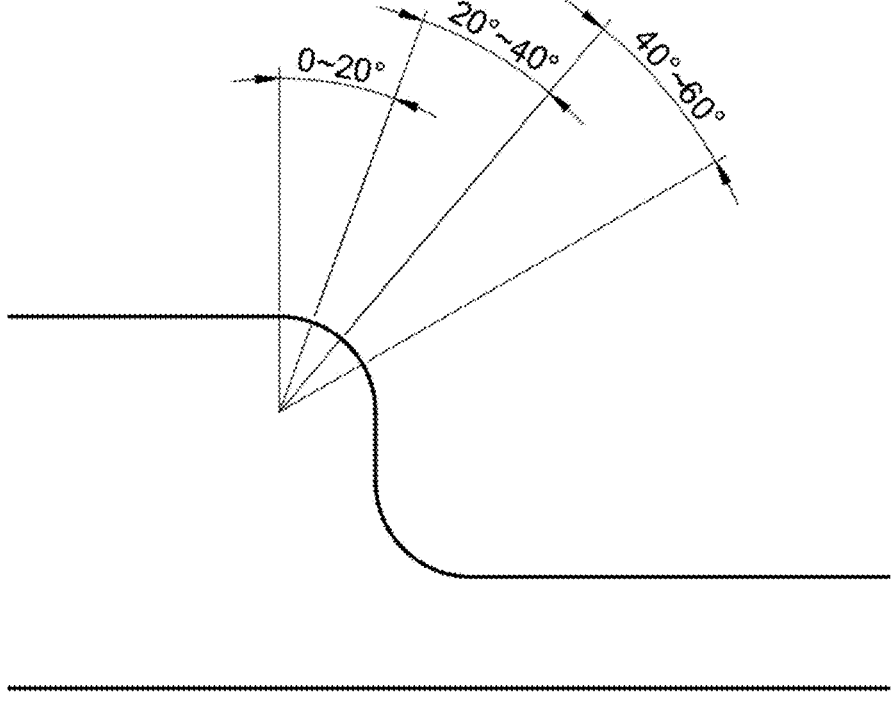
FIG. 4 is a schematic diagram of measurement ranges corresponding to different dispersive metalenses according to the present disclosure.

FIG. 4 is a schematic diagram of measurement ranges corresponding to different dispersive metalenses according to the present disclosure. As shown in FIG. 4, optical axes of the first dispersive metalens, the second dispersive metalens, and the third dispersive metalens are arranged according to respective preset inclination angles, and correspond to areas of the surface of the measured object in different ranges of inclination angle, respectively. The inclination angles refer to the angles offset from the normal.

Specifically, when the curved surface contour is measured, because the tolerance angle θ of a single first dispersive metalens 7 is limited, when the surface of the measured object is inclined too much, light passing through the first dispersive metalens 7 cannot return to the first dispersive metalens 7. Therefore, the second dispersive metalens 8 and the third dispersive metalens 9 are configured to correspond to the surfaces of the measured object in different ranges of inclination angle. For example, the range of inclination angle corresponding to the first dispersive metalens 7 is from 0 to 20 degrees, the range of inclination angle corresponding to the second dispersive metalens 8 is from 20 to 40 degrees, and the range of inclination angle corresponding to the third dispersive metalens 9 is from 40 to 60 degrees.

(3) Determining a Displacement Value Corresponding to Each Scanning Point According to the Peak Wavelength of Each Scanning Point Includes: Using a Predetermined Mapping Function to Convert the Peak Wavelength into the Displacement Value. The Mapping Function is a Polynomial.

Taking the first dispersive metalens 7 as an example, the measuring process by a single dispersive metalens will be described (the measurement methods for other optical paths are basically the same except for differences in the optical paths, which will not be described in detail here).

As shown in FIG. 3, the light source 14 generates polychromatic light, and emits divergent light through the first optical fiber 4. After passing through the first dispersive metalens 7, the light with different wavelengths in the polychromatic light is focused on different positions. The focusing position of long-wavelength light is close to the first dispersive metalens 7, and the focusing position of short-wavelength light is far from the first dispersive metalens 7, thereby forming a measurement range S. At this time, when the surface 13 of the measured object is within the measurement range S, the light reflected by the surface 13 of the measured object returns to the first optical fiber 4 through the first dispersive metalens 7. The reflected light passes through the first optical fiber 4 to reach the spectrometer 12, and the spectrometer 12 obtains the measurement signal. The surface 13 of the measured object changes within the measurement range S, and a unimodal signal moves accordingly.

A wavelength sequence is defined as:

$$\Lambda = [\lambda_1, \lambda_2, \dots, \lambda_{n-1}, \lambda_n],$$

where $\Lambda$ is the wavelength sequence data output by the spectrometer.

When the object is within the measurement range S, the spectral light intensity data can be obtained by the spectrometer, as shown in FIG. 3. The spectral light intensity sequence data is defined as:

$$I = [I(\lambda_1), I(\lambda_2), \dots, I(\lambda_{n-1}), I(\lambda_n)],$$

where l is the light intensity sequence data corresponding to the wavelength value output by the spectrometer.

Obtaining a peak wavelength of each scanning point according to the wavelength sequence data and the light intensity sequence data of each scanning point includes:

obtaining a value of light intensity corresponding to the value of each wavelength according to the wavelength sequence data and the light intensity sequence data;

multiplying the value of each wavelength with the corresponding value of light intensity to obtain a set of products; and adding all products to obtain the sum; and dividing the sum of the products by the sum of all values of light intensity to obtain the peak wavelength.

The expression is as follows:

$$\lambda_i = \frac{\sum \lambda \cdot I(\lambda)}{\sum I(\lambda)}, \lambda \in [\lambda_1, \lambda_2, \dots, \lambda_{n-1}, \lambda_n],$$

where $\lambda_i$ is the calculated peak wavelength; and the displacement value is calculated by the peak wavelength $\lambda_i$, and is expressed as follows:

$$d = f(\lambda_i) = a_0 + \sum_{j=1}^{m} a_j \cdot \lambda_i^j,$$

where d is the calculated displacement value, $\alpha_0$ and $\alpha_j$ are polynomial coefficients, and $$\lambda_i^j$$

denotes the j-th power of $\lambda_i$.

(4) The Displacement Value Corresponding to Each Scanning Point is Converted into Spatial Position Information.

In the present disclosure, by moving the position of the probe, the specific measured area of the measured object (the inner surface or the transition curved surface contour of the micropore) can be adjusted.

As shown in FIG. 1, when measuring the inner surface of the micropore, the probe is adjusted, so that the measured surfaces for the first dispersive metalens 7, the first reflecting prism 1 and the first optical fiber 4 are within the measurement range S, and the inner surface of the micropore is scanned to obtain the scanning points. According to the present disclosure, the displacement value corresponding to each scanning point can be directly used as the spatial position information, so as to fit the subsequent inner surface of the micropore.

As shown in FIG. 2, in the present disclosure, when measuring the transition curved surface contour, the spatial position information corresponding to the displacement value can be determined according to the displacement value corresponding to each scanning point in combination with the relative position relationships between the dispersive metalenses.

The probe is moved to scan the transition curved surface contour, so as to obtain the displacement values of the scanning points measured by the three optical paths. In combination with the relative position relationship between the three dispersive metalenses (that is, the first dispersive metalens, the second dispersive metalens and the third dispersive metalens) obtained by the design parameters, such as the relative inclination angles between the optical axes of all the dispersive metalenses, the relative spatial distances between the centers of all the dispersive metalenses, the distance from the scanning point to the center of each dispersive metalens, and other parameters, the relative spatial position data between the three scanning points are calculated according to the spatial geometry.

(5) The Spatial Position Information of the Scanning Points of the Inner Surface and the Transition Curved Surface Contour of the Micropore is Fit to Determine the Contour of the Surface of the Measured Object.

The present disclosure can use a numerical fitting method to fit the contour of the surface of the measured object.

In another aspect, the present disclosure further provides a method for measuring an inner surface and a transition curved surface contour of a micropore. FIG. 5 is a flow chart of a method for measuring an inner surface and a transition curved surface contour of a micropore according to the present disclosure. As shown in FIG. 5, the following steps are included.

Step 501: optical signals are projected to a surface of a measured object through at least three optical paths, where:

in a first optical path, divergent light emitted by a first optical fiber is reflected via a first reflecting prism and focused on the surface of the measured object through a first dispersive metalens;

in a second optical path, divergent light emitted by a second optical fiber is reflected via a second reflecting prism and focused on the surface of the measured object through a second dispersive metalens; and in a third optical path, divergent light emitted by a third optical fiber is reflected via a third reflecting prism and focused on the surface of the measured object through a third dispersive metalens.

Preferably, optical axes of the first dispersive metalens, the second dispersive metalens, and the third dispersive metalens are arranged according to respective preset inclination angles, and correspond to areas of the surface of the measured object in different ranges of inclination angle, respectively.

Preferably, the divergent light in each optical path is broad-spectrum divergent light (divergent light with a wavelength within a preset range), such as light with a preset wavelength range from 360 nm to 1100 nm according to requirements.

Step 502: reflected lights from the surface of the measured object returning along respective original optical paths are received by the first optical fiber, the second optical fiber and the third optical fiber, respectively, the reflected lights are analyzed by a spectrometer to output wavelength sequence data and light intensity sequence data of a scanning point for each optical path.

Step 503: a peak wavelength of each scanning point is obtained according to the wavelength sequence data and the light intensity sequence data of each scanning point, and a displacement value corresponding to each scanning point is determined according to the peak wavelength of each scanning point.

Step 504: spatial position information of each scanning point is determined according to the displacement value corresponding to each scanning point.

In the present disclosure, for the measurement of the inner surface of the hole, that is, the scanning points corresponding to the first optical path, the displacement value can be directly used as the spatial position information.

In the present disclosure, for the measurement of the transition curved surface contour, that is, the scanning points corresponding to the second optical path and the third optical path, the spatial position information corresponding to the displacement value can be determined according to the displacement value corresponding to each scanning point in combination with the relative position relationship between the dispersive metalenses.

Step 505: the spatial position information of all scanning points is fit to determine a contour of the surface of the measured object; where the contour of the surface of the measured object includes the inner surface and the transition curved surface contour of the micropore; where the inner surface of the hole is determined by using the scanning points corresponding to the first optical path; and the transition curved surface contour is determined by using the scanning points corresponding to all optical paths.

To sum up, according to the present disclosure, the use of the structural design that a plurality of optical paths are integrated with dispersive metalenses effectively breaks through the limitation of the conventional chromatic confocal sensor that the volume is large and the tolerance angle is small, and achieves the high-precision non-contact measurement of the inner surface of the micropore and the transition curved surface contour. That is, three groups of dispersive metalenses and optical paths are used for collaborative measurement, so that the sensor volume is compressed to adapt to a narrow space, and further, the detection capability of complex curved surfaces (including high-curvature transition characteristics) is improved through the coverage of multi-angle optical path. Combined with the axial tomography advantages of the chromatic confocal technology, the displacement value corresponding to the peak wavelength of each scanning point can be accurately extracted, and the surface morphology can be reconstructed by fitting three-dimensional spatial data, which solves the challenge in the industry that the conventional measurement technology find difficult to balance a small aperture and a complex curved surface in the fields such as electronic manufacturing and aerospace.

The above is only an exemplary embodiment of the present disclosure, which cannot be used to limit the scope of the present disclosure. That is, all equivalent changes and modifications made according to the teaching of the present disclosure fall still within the scope of the present disclosure. Other embodiments of the present disclosure will be conceivable to those skilled in the art after the specification is taken into account and the present disclosure herein is practiced. The present disclosure is intended to cover any variations, uses or adaptations of the present disclosure, which follow the general principles of the present disclosure and include common sense or common technical means in the technical field not described in the present disclosure. The specification and embodiments are to be regarded as exemplary only, and the scope and the spirit of the present disclosure are defined by the claims.

The technical features of the above embodiments can be combined at will. In order to make the description concise, not all possible combinations of the technical features in the above embodiments are described. However, as long as there is no contradiction between the combinations of these technical features, the combinations should be considered as the scope described in the specification.

Those skilled in the art can easily understand that the above is only the preferred embodiment of the present disclosure, which cannot be used to limit the present disclosure. Any modification, equivalent substitution and improvement made within the spirit and the principle of the present disclosure should be included in the scope of protection of the present disclosure.

What is claimed is:

1. An apparatus for measuring an inner surface and a transition curved surface contour of a micropore, comprising:

at least three optical paths comprising a first optical path, a second optical path and a third optical path, wherein the first optical path comprises a first optical fiber, a first reflecting prism and a first dispersive metalens, and divergent light emitted by the first optical fiber is reflected to the first dispersive metalens via the first reflecting prism and focused on a surface of a measured object through the first dispersive metalens;

the second optical path comprises a second optical fiber, a second reflecting prism and a second dispersive metalens, and divergent light emitted by the second optical fiber is reflected to the second dispersive metalens via the second reflecting prism and focused on the surface of the measured object through the second dispersive metalens; and the third optical path comprises a third optical fiber, a third reflecting prism and a third dispersive metalens, and divergent light emitted by the third optical fiber is reflected to the third dispersive metalens via the third reflecting prism and focused on the surface of the measured object through the third dispersive metalens;

a spectrometer configured to analyze reflected lights from the surface of the measured object returning along respective original optical paths and received by the first optical fiber, the second optical fiber and the third optical fiber, respectively, and to output wavelength sequence data and light intensity sequence data of a scanning point for each optical path;

a processing unit configured to:

obtain a peak wavelength of each scanning point according to the wavelength sequence data and the light intensity sequence data of each scanning point, and determine a displacement value corresponding to each scanning point according to the peak wavelength of each scanning point;

determine spatial position information of each scanning point according to the displacement value corresponding to each scanning point; and fit spatial position information of all scanning points to determine a contour of the surface of the measured object; wherein the contour of the surface of the measured object comprises the inner surface and the transition curved surface contour of the micropore;

wherein the inner surface of the micropore is determined by using a scanning point corresponding to the first optical path; and the transition curved surface contour is determined by using scanning points corresponding to all optical paths.

2. The apparatus for measuring the inner surface and the transition curved surface contour of the micropore according to claim 1, wherein optical axes of the first dispersive metalens, the second dispersive metalens, and the third dispersive metalens are arranged according to respective preset inclination angles, and correspond to areas of the surface of the measured object in different ranges of inclination angle, respectively.

3. The apparatus for measuring the inner surface and the transition curved surface contour of the micropore according to claim 1, further comprising: a probe shell;

wherein the at least three optical paths are arranged in the probe shell.

4. The apparatus for measuring the inner surface and the transition curved surface contour of the micropore according to claim 1, wherein the divergent light emitted by each optical fiber is broad-spectrum divergent light.

5. The apparatus for measuring the inner surface and the transition curved surface contour of the micropore according to claim 1, wherein determining the displacement value corresponding to each scanning point according to the peak wavelength of each scanning point comprises:

using a predetermined mapping function to convert the peak wavelength into the displacement value.

6. The apparatus for measuring the inner surface and the transition curved surface contour of the micropore according to claim 5, wherein the mapping function is a polynomial.

7. A method for measuring an inner surface and a transition curved surface contour of a micropore, comprising:

projecting optical signals to a surface of a measured object through at least three optical paths, wherein:

in a first optical path, divergent light emitted by a first optical fiber is reflected via a first reflecting prism and focused on the surface of the measured object through a first dispersive metalens;

in a second optical path, divergent light emitted by a second optical fiber is reflected via a second reflecting prism and focused on the surface of the measured object through a second dispersive metalens; and in a third optical path, divergent light emitted by a third optical fiber is reflected via a third reflecting prism and focused on the surface of the measured object through a third dispersive metalens;

receiving reflected lights from the surface of the measured object returning along respective original optical paths by the first optical fiber, the second optical fiber and the third optical fiber, respectively, analyzing the reflected lights by a spectrometer to output wavelength sequence data and light intensity sequence data of a scanning point for each optical path;

obtaining a peak wavelength of each scanning point according to the wavelength sequence data and the light intensity sequence data of each scanning point, and determining a displacement value corresponding to each scanning point according to the peak wavelength of each scanning point;

determining spatial position information of each scanning point according to the displacement value corresponding to each scanning point; and fitting spatial position information of all scanning points to determine a contour of the surface of the measured object; wherein the contour of the surface of the measured object comprises the inner surface and the transition curved surface contour of the micropore;

wherein the inner surface of the micropore is determined by using a scanning point corresponding to the first optical path; and the transition curved surface contour is determined by using scanning points corresponding to all optical paths.

8. The method for measuring the inner surface and the transition curved surface contour of the micropore according to claim 7, wherein optical axes of the first dispersive metalens, the second dispersive metalens, and the third dispersive metalens are arranged according to respective preset inclination angles, and correspond to areas of the surface of the measured object in different ranges of inclination angle, respectively.

9. The method for measuring the inner surface and the transition curved surface contour of the micropore according to claim 7, wherein the divergent light in each optical path is broad-spectrum divergent light.

10. The method for measuring the inner surface and the transition curved surface contour of the micropore according to claim 7, wherein the determining the displacement value corresponding to each scanning point according to the peak wavelength of each scanning point comprises:

using a predetermined mapping function to convert the peak wavelength into the displacement value.

* * * * *